US012492579B2

(12) United States Patent
Lai

(10) Patent No.: US 12,492,579 B2
(45) Date of Patent: Dec. 9, 2025

(54) PADLOCK WITH BIOMETRIC OPENING MEANS

(71) Applicant: The Sun Lock Company Limited, Tuen Mun (HK)

(72) Inventor: Karl Lai, Tai Po (HK)

(73) Assignee: THE SUN LOCK COMPANY LIMITED, Tuen Mun (HK)

( * ) Notice: Subject to any disclaimer, the term of this patent is extended or adjusted under 35 U.S.C. 154(b) by 48 days.

(21) Appl. No.: 18/526,076

(22) Filed: Dec. 1, 2023

(65) Prior Publication Data

US 2024/0191544 A1 Jun. 13, 2024

Related U.S. Application Data

(60) Provisional application No. 63/431,142, filed on Dec. 8, 2022.

(51) Int. Cl.
*E05B 47/00* (2006.01)
*E05B 67/22* (2006.01)

(52) U.S. Cl.
CPC .......... *E05B 47/0012* (2013.01); *E05B 67/22* (2013.01); *E05B 2047/0017* (2013.01); *E05B 2047/0024* (2013.01); *E05B 2047/0058* (2013.01)

(58) Field of Classification Search
CPC .......... E05B 67/00; E05B 67/02; E05B 67/06; E05B 67/063; E05B 67/22; E05B 67/24
See application file for complete search history.

(56) References Cited

U.S. PATENT DOCUMENTS

| | | | |
|---|---|---|---|
| 6,373,967 B2 | 4/2002 | Pu et al. | |
| 6,927,671 B2 | 8/2005 | DeBono | |
| D519,356 S | 4/2006 | Osiecki et al. | |
| D581,245 S | 11/2008 | Conway | |
| D581,246 S | 11/2008 | Conway | |
| 7,525,411 B2 | 4/2009 | Strader et al. | |
| 7,734,068 B2 | 6/2010 | Fisher | |
| 7,899,219 B2 | 3/2011 | Slevin | |

(Continued)

FOREIGN PATENT DOCUMENTS

| | | | |
|---|---|---|---|
| AU | 2011279020 | 1/2012 | |
| AU | 2011279020 A1 * | 1/2013 | ......... E05B 47/0012 |

(Continued)

OTHER PUBLICATIONS

Computer Generated Translation for CN 112127712, Generated on Apr. 15, 2025, https://worldwide.espacenet.com/patent/ (Year: 2025).*

(Continued)

*Primary Examiner* — Alyson M Merlino
(74) *Attorney, Agent, or Firm* — Ware Fressola, Maguire & Barber LLP

(57) ABSTRACT

A padlock including a lock body, a fingerprint panel configured for operation of the padlock from a locked mode to an unlocked mode by using an electronic mechanism, a shackle having a long leg and a short leg, at least one bolt configured to engage with or disengage with the shackle, a cam to control the movement of the at least one bolt, a sloped-cam to control the movement of the cam, and a motor operatively coupled to the fingerprint panel and having teeth to control movement of the sloped-cam.

13 Claims, 5 Drawing Sheets

(56) References Cited

U.S. PATENT DOCUMENTS

| | | | | |
|---|---|---|---|---|
| 7,903,846 | B2 | 3/2011 | Fisher | |
| 7,908,896 | B1 | 3/2011 | Olson et al. | |
| 7,948,359 | B2 * | 5/2011 | Marcelle | E05B 67/24 70/38 A |
| 9,556,651 | B1 * | 1/2017 | Cabral Herrera | E05B 67/22 |
| 10,422,163 | B1 | 9/2019 | Cabral Herrera | |
| 10,445,961 | B1 | 10/2019 | Chen | |
| 10,553,053 | B2 | 2/2020 | Chen | |
| 10,572,639 | B2 | 2/2020 | Ranjit et al. | |
| 10,872,482 | B1 | 12/2020 | Colton | |
| D906,785 | S | 1/2021 | Kinas et al. | |
| 11,193,309 | B1 | 12/2021 | Cabral Herrera | |
| 11,954,959 | B2 | 4/2024 | Lai | |
| 11,959,309 | B2 * | 4/2024 | Banse | E05B 67/063 |
| 12,044,039 | B2 | 7/2024 | Luo | |
| 2010/0027044 | A1 | 2/2010 | Moore | |
| 2015/0225986 | A1 * | 8/2015 | Goldman | E05B 67/02 70/20 |
| 2020/0032557 | A1 * | 1/2020 | Nguyen | E05B 67/10 |
| 2020/0291684 | A1 | 9/2020 | Kinas et al. | |
| 2021/0254370 | A1 | 8/2021 | Szarka-Kovacs | |
| 2022/0198863 | A1 | 6/2022 | Ho | |
| 2022/0282527 | A1 | 9/2022 | Banse | |
| 2023/0304324 | A1 * | 9/2023 | Millikin | E05B 67/22 |

FOREIGN PATENT DOCUMENTS

| | | | | | |
|---|---|---|---|---|---|
| CN | 105888403 | | | 8/2016 | |
| CN | 207212034 | | | 4/2018 | |
| CN | 108086815 | A | * | 5/2018 | E05B 67/00 |
| CN | 108468478 | A | * | 8/2018 | E05B 47/0002 |
| CN | 109113458 | A | * | 1/2019 | E05B 47/0012 |
| CN | 109790727 | | | 5/2019 | |
| CN | 110047177 | | | 7/2019 | |
| CN | 110159089 | A | | 8/2019 | |
| CN | 209908166 | | | 1/2020 | |
| CN | 210178134 | | | 3/2020 | |
| CN | 210714184 | | | 6/2020 | |
| CN | 210714184 | U | * | 6/2020 | |
| CN | 112127712 | A | * | 12/2020 | E05B 47/0012 |
| CN | 213683577 | | | 7/2021 | |
| CN | 213683577 | U | * | 7/2021 | |
| CN | 215485345 | | | 1/2022 | |
| JP | 52008760 | B1 | | 3/1977 | |
| JP | 60030779 | A | | 2/1985 | |
| JP | 3150956 | U | | 6/2009 | |
| JP | 3234909 | U | | 11/2021 | |
| KR | 20140100735 | | | 8/2014 | |
| KR | 20140100735 | A | * | 8/2014 | |
| WO | WO-2012009607 | A1 | * | 1/2012 | E05B 47/0012 |
| WO | 2019047494 | | | 3/2019 | |
| WO | WO-2021169180 | A1 | * | 9/2021 | E05B 15/00 |

OTHER PUBLICATIONS

Computer Generated Translation for KR 1020140100735 A, Generated on Sep. 5, 2025, https://worldwide.espacenet.com/patent/ (Year : 2025).*

* cited by examiner

PADLOCK WITH BIOMETRIC OPENING MEANS

CROSS-REFERENCE TO RELATED APPLICATIONS

This application claims priority to U.S. Provisional Appl. No. 63/431,142 filed Dec. 8, 2022, which is hereby incorporated by reference in its entirety.

BACKGROUND OF THE INVENTION

1. Field of the Invention

The present invention generally relates to a lock having a deadbolt mechanism, and more particularly to a padlock having a biometric opening mechanism for operation of the deadbolt mechanism.

2. Related Art

There are many biometric locks in the market that can be easily opened by an attacker as a result of these locks having latch locking mechanisms. The present invention overcomes the attacks commonly employed against latch locking mechanisms, since the bolt is configured to cause the padlock to stay in the locked mode. This will improve the lock security level. The bolt has a spring to exert force to make the bolt always push toward the locked position, and the cam only has rotational movement such that a spring will push the cam to the locked position which inhibits movement of the bolt unless the cam is rotated into an unlocked position.

SUMMARY OF THE INVENTION

An exemplary embodiment of the present invention is directed to a padlock including a lock body, a fingerprint panel to configured for operation of the padlock from a locked mode to an unlocked mode by using an electronic mechanism, a shackle having a long leg and a short leg, at least one bolt configured to engage with and disengage with the shackle, a cam to control the movement of the at least one bolt, a sloped-cam to control the movement of the cam, and a motor operatively coupled to the fingerprint panel and having teeth to control movement of the sloped-cam.

An object of the present invention is to provide a padlock configured for operation from a locked mode to an unlocked mode by a fingerprint panel.

It is another object of the present invention to provide a padlock in which the padlock can be unlocked by presenting an authorized fingerprint to the fingerprint panel.

It is still another object of the present invention to provide a padlock having a cam configured for rotational movement within the padlock, and the padlock remains in the locked mode unless the cam has been rotated.

It is yet another object of the present invention to provide a padlock in which the cam inhibits the movement of one or more bolts within the padlock.

It is another object of the present invention to provide a padlock in which the one or more bolts are urged into contact with a shackle of the padlock in the locked mode.

It is still another object of the present invention to provide a padlock having an electronic motor for control of rotation of the cam.

It is yet another object of the present invention to provide a padlock having an additional or alternative mechanism for operating the padlock by use of an electronic device providing a signal to the padlock.

It will thus be seen that these and other objects can be obtained by a padlock according to an exemplary aspect of the present invention including a lock body, a shackle having a long leg and a short leg, where either or both the long leg and the short leg have a bolt-cutout formed therein, and the long leg of the shackle is retained within the lock body, at least one bolt, each bolt configured for engagement with the bolt-cutout on either the long leg or the short leg when the padlock is in a locked mode, and each bolt is configured for disengagement from the bolt-cutout on either the long leg or the short leg when the padlock is in an unlocked mode, and a fingerprint panel configured to cause operation of the padlock from the locked mode to the unlocked mode.

According to this and other exemplary aspects of the present invention, the padlock further includes a cam configured for rotational movement within the lock body, and having at least one opening-slot, each opening-slot is configured to receive one bolt from the at least one bolt when the padlock is in the unlocked mode, and the padlock further includes a sloped-cam operatively coupled to the cam and configured to control rotational movement of the cam within the lock body.

According to this and other exemplary aspects of the present invention, each of the at least one bolt includes a shackle-locking side configured for engagement with the bolt-cutout on either the long leg or the short leg and a spring receiving surface, and the padlock further includes a bolt spring positioned in the lock body for each bolt of the at least one bolt, and each bolt spring is configured to engage with the spring receiving surface to urge each bolt in a direction towards the bolt-cutout on either the long leg or the short leg.

According to this and other exemplary aspects of the present invention, the at least one bolt includes two bolts, and a first bolt of the two bolts is configured for engagement with the bolt-cutout on the long leg, and a second bolt of the two bolts is configured for engagement with the bolt-cutout on the short leg.

According to this and other exemplary aspects of the present invention, the short leg of the shackle is retained within the lock body of the padlock by one of the at least one bolts when the padlock is in the locked mode.

According to this and other exemplary aspects of the present invention, the padlock further includes a motor positioned within the lock body and operatively coupled to the sloped-cam, and the motor is configured to operate and cause rotational movement of the sloped-cam when an authorized user provides a fingerprint to the fingerprint panel.

According to this and other exemplary aspects of the present invention, the cam further includes a tail configured for operative engagement with the sloped-cam, and the sloped-cam further includes a lock-slope and an opening-slope, the lock-slope is configured for engagement with the tail of the cam when the padlock is in the locked mode, and the opening-slope is configured for engagement with the tail of the cam when the padlock is in the unlocked mode.

According to this and other exemplary aspects of the present invention, the cam further includes a pole extending therefrom and configured for engagement with a cam spring positioned within the lock body and configured to urge the pole in a direction so that the tail of the cam is engaged with the lock-slope of the sloped-cam when the padlock is in the locked mode.

According to this and other exemplary aspects of the present invention, the padlock further includes a motor positioned within the lock body and operatively coupled to the sloped-cam, and the motor is configured to rotate the sloped-cam such that the opening-slope of the sloped-cam contacts the tail of the cam to rotate the cam such that each bolt of the at least one bolts is received by the opening-slots of the cam.

According to this and other exemplary aspects of the present invention, the lock-slope has a height which is less than the height of the opening-slope.

According to this and other exemplary aspects of the present invention, the motor includes teeth and the sloped-cam includes a motor-teeth receiving slot configured for operative engagement with the teeth of the motor such that rotational movement of the motor is transferred to the sloped-cam, and the motor is configured to rotate when an authorized user provides a fingerprint to the fingerprint panel.

According to this and other exemplary aspects of the present invention, the padlock further includes a shackle spring engaged with the long leg of the shackle, the shackle spring is configured to urge the long leg in a direction such that the bolt engaged with the bolt-cutout on the long leg becomes disengaged with the bolt-cutout and the bolt is received within one of the opening-slots of the cam, and the shackle spring is configured to urge the long leg in the direction such that the short leg of the shackle is removed from the lock body so as to position the padlock in the unlocked mode.

According to this and other exemplary aspects of the present invention, the bolt disengaged from the bolt-cutout on the long leg includes a shackle-locking side configured for engagement with the bolt-cutout on the long leg when the padlock is in the locked mode and configured for engagement with the long leg when the padlock is in the unlocked mode, the bolt disengaged from the bolt-cutout on the long leg further includes a cam-locking side configured for engagement with one of the opening-slots of the cam when the padlock is in the unlocked mode, and in the unlocked mode the bolt disengaged from the bolt-cutout on the long leg is positioned between the long leg and one of the opening-slots of the cam.

According to this and other exemplary aspects of the present invention, when the bolt disengaged from the bolt-cutout on the long leg is positioned between the long leg and one of the opening-slots of the cam the cam is unable to substantially rotate within the lock body of the padlock.

According to this and other exemplary aspects of the present invention, each of the at least one bolt includes a shackle-locking side configured for engagement with the bolt-cutout on either the long leg or the short leg and a spring receiving surface, the padlock further includes a bolt spring positioned in the lock body for each bolt of the at least one bolt, and each bolt spring is configured to engage with the spring receiving surface to urge each bolt in a direction towards the bolt-cutout on either the long leg or the short leg, and when the bolt-cutout on either the long leg or the short leg is aligned with the shackle-locking side of the at least one bolt, the bolt spring is configured to push the cam-locking side of the bolt away from the opening-slot of the cam and the cam spring is configured to push the pole of the cam in order to rotate the cam until the tail of the cam contacts the lock-slope of the sloped-cam.

According to this and other exemplary aspects of the present invention, there is clearance between the locking-surface of the cam and the cam-locking side of the at least one bolt.

According to this and other exemplary aspects of the present invention, the fingerprint panel is configured for receipt of a signal from an electronic device to cause operation of the padlock from the locked mode to the unlocked mode.

According to this and other exemplary aspects of the present invention, the bolt further includes a bolt spring to always push the bolt toward the cutout of the shackle during the locked mode.

According to this and other exemplary aspects of the present invention, the bolt contains a shackle-locking-side which always interacts with the bolt-cutout of the long-leg shackle of the shackle, and the bolt also contains a cam-locking-side to interact with the cam to control movement of the bolt from the locked mode, where the cam-locking-side contacts the locking surface of the cam, to the unlocked mode, where the cam-locking-side engages with the opening-slot of the cam.

According to this and other exemplary aspects of the present invention, the cam contains a tail to contact the lock-slope and the opening-slope of the sloped-cam, a cam spring is placed inside the cam-spring-slot of the lock body and contacts the pole of the cam to exert force to let the cam only have rotational movement toward the locking position such that the tail will contact the lock-slope of the sloped-cam.

According to this and other exemplary aspects of the present invention, the sloped-cam has a motor-teeth-receiving-slot to receive the teeth of the motor, so that the motor will control the rotational movement of the sloped-cam, so that the sloped-cam is in the locked position when the lock-slope is contacting the tail of the cam, so that when the correct fingerprint is present in the panel, the motor and sloped-cam will turn, and the sloped-cam will turn such that the opening-slope will contact the tail and the cam rotates from the locked mode to the unlocked mode.

According to this and other exemplary aspects of the present invention, when in the locked mode the shackle-locking-side of the bolt is engaged in the bolt-cutout of the shackle, the cam-locking-side of the bolt is in contact with the locking surface of the cam, and a bolt-spring always exerts a force to let the bolt be pushed outward such that the shackle-locking-side always engages with the bolt-cutout of the shackle.

According to this and other exemplary aspects of the present invention, when in the unlocked mode, the sloped-cam is driven such that the opening-slope contacts the tail of the cam and rotates the cam such that the opening-slot aligns with the cam-locking-side of the bolt, the shackle spring exerts a force to let the shackle be pushed upward and the shackle-locking-side of the bolt pushes back and the cam-locking-side of the bolt engages with the opening-slot, so that the long-leg shackle is now in contact with the shackle-locking-side of the bolt, in this sandwiched position the cam is unable to rotate towards the locked mode, and the short-leg shackle is out of the short leg shackle hole of the lock body.

According to this and other exemplary aspects of the present invention, the padlock is relocked by a user pushing the short-leg shackle in the short leg shackle hole of the lock body, so that the bolt-cutout of the shackle re-aligns with the shackle-locking side of the bolt so that the bolt spring exerts a force to push the bolt outward toward the bolt-cutout, which causes the cam-locking-side of the bolt to disengage from the opening-slot of the cam, and since when in this position nothing blocks the cam, then the cam spring exerts a force to push the pole of the cam to rotate the cam to the locked position, and the tail will rejoin the lock-slope of the sloped-cam to the locked position.

According to this and other exemplary aspects of the present invention, the cam contains a hole to be assembled with the cam pole of the lock body, and when assembled in such a position the cam can only exert a rotational movement.

According to this and other exemplary aspects of the present invention, the cam-locking-side of the bolt is aligned with the locking-surface of the cam so as to still have some free tolerance of not touching the locking-surface of the cam as the bolt-spring will push the bolt toward the bolt-cutout of the shackle during the locked mode, so that when the motor turns, then the sloped-cam will push the tail of the cam from the locked mode to the unlocked mode such that the cam will freely rotate in the same manner without the cam-locking-side of the bolt contacting the cam to disrupt the rotational movement of the cam during the rotational turning from the locked mode to the unlocked mode.

According to this and other exemplary aspects of the present invention, when in the relocked mode and the user pushes the shackle to the locked position, then the bolt-cutout of the shackle is pushed to align with the shackle-locking-side of the bolt, the bolt spring pushes the cam-locking-side of the bolt away from the opening-slot of the cam, as nothing blocks the cam, the cam spring pushes the pole of the cam in the locking rotation direction so the cam will rotate until the tail of the cam contacts the lock-slope of the sloped-cam and the shackle-locking-side of the bolt will engage with the cutout of the shackle.

According to this and other exemplary aspects of the present invention, the sloped-cam has a lock-slope at one end thereof and the other end is an opening-slope so that both slopes will contact the tail of the cam for locking and opening purposes.

According to this and other exemplary aspects of the present invention, the lock-slope has a height which is lower than the height of the opening-slope.

According to this and other exemplary aspects of the present invention, the cam contains a tail whose movement is controlled by the sloped-cam, so that the lock-slope of the sloped-cam will always align with the tail of the cam during the locked mode, the opening-slope of the cam pushes the tail of the cam to the unlocked mode when a correct fingerprint has been placed in the fingerprint panel to drive the motor to turn and also to turn the sloped-cam from the lock-slope to the opening-slope which pushes the tail of the cam to the unlocked mode.

According to this and other exemplary aspects of the present invention, the fingerprint panel contains another unlocking means, namely in addition or instead of the fingerprint to unlock the padlock, the panel contains a Bluetooth chip to unlock the padlock via a Smartphone application, wherein the Smartphone application could also control and manage the fingerprint accessibility.

The exemplary aspects of the present invention discussed are merely exemplary, and it is understood the present invention is not limited to any particular aspects or combinations thereof. Rather, the present invention encompasses both individual elements of the exemplary aspects alone, and in combination with any other individual elements whether or not specifically recited as an exemplary aspect.

The reference numbers and corresponding elements are summarized below:

10: padlock
20: cover
21: shackle through hole
22: fixture hole
23: opening
30: shackle-top-cover
31: shackle through hole
40: front body
41: short-leg shackle hole
42: long-leg shackle hole
42a: shackle-fin-slot
42b: fin stopper
43: bolt slot
43a: bolt-spring slot
44: cam pole
44a: cam-spring-slot
45: motor-slot
46: panel-slot
47: flash-light hole
48: battery slot
49: USB slot
49a: USB-cover hole
50: rear body
51: short-leg shackle hole
52: long-leg shackle hole
52a: shackle-fin-slot
52b: fin stopper
53: bolt slot
54: USB slot
55: USB-cover hole
56: fixture hole
60: shackle
61: bolt-cutout
62: extended-fin
63: short-leg shackle
64: long-leg shackle
70: bolt
71: shackle-locking-side
72: cam-locking-side
73: spring receiving surface
80: cam
81: hole
82: opening-slot
83: tail
84: pole
85: locking-surface
90: sloped-cam
91a: lock-slope
91b: opening-slope
92: motor-teeth-receiving-slot
100: motor
101: teeth
110: fingerprint panel
111: fingerprint sensor
112: USB charging port
113: flash light
120: battery
130: USB cover
140: bolt spring
150: cam spring
160: shackle spring
170: fixture peg

BRIEF DESCRIPTION OF THE DRAWINGS

For a fuller understanding of the nature and object of the present invention, reference should be had to the following detailed description taken in connection with the accompanying drawings, in which.

DETAILED DESCRIPTION

Figure 1A:
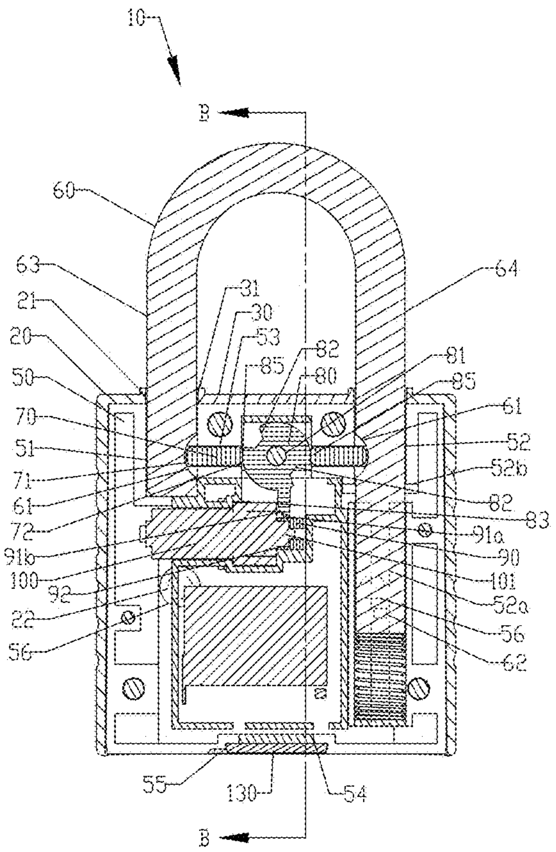
FIG. 1A is a cross-sectional view of an exemplary padlock according to an aspect of the invention in a locked mode taken along line A-A from FIG. 1B.
Figure 1B:
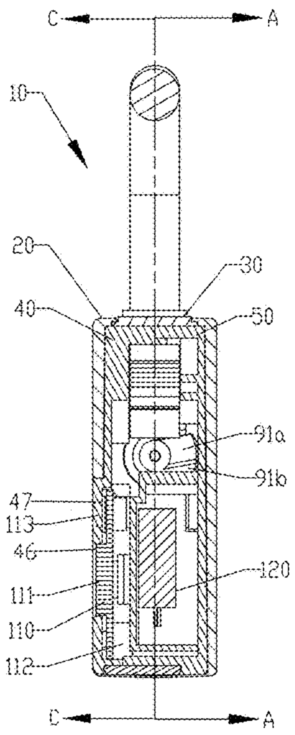
FIG. 1B is a cross-sectional view of the exemplary padlock taken along line B-B from FIG. 1A.
Figure 1C:
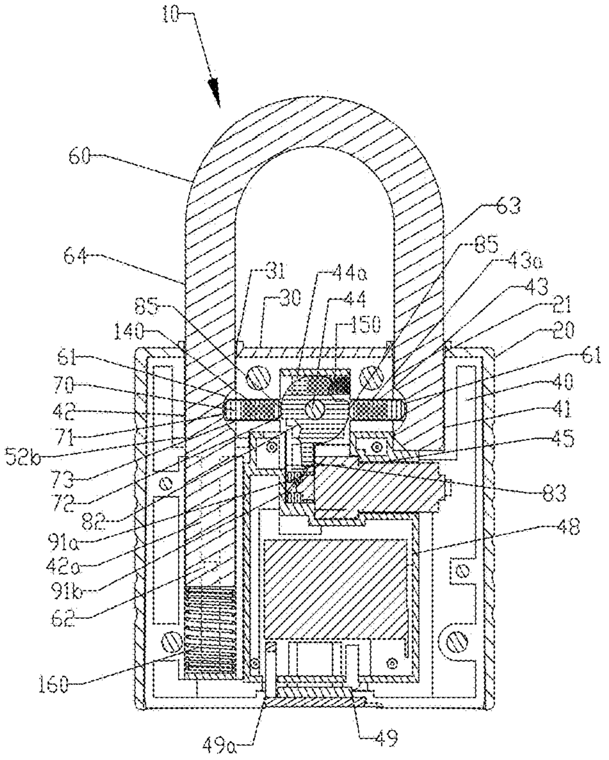
FIG. 1C is a cross-sectional view of the exemplary padlock taken along line C-C from FIG. 1B.
Figure 2:
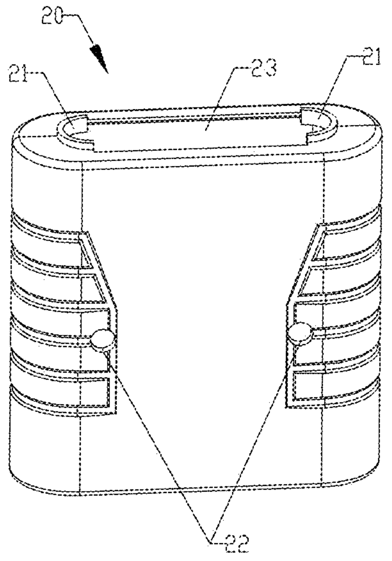
FIG. 2 is a perspective view of an exemplary cover that may be used with the exemplary padlock according to an aspect of the present invention.
Figure 3:
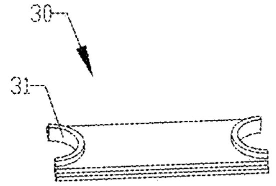
FIG. 3 is a perspective view of an exemplary shackle-top cover that may be used with the exemplary padlock according to an aspect of the present invention.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIGS. 1A-1C, 2-3, 4A-4B, 5A-5B and 14A-14C, therein illustrated is an exemplary padlock, generally indicated by reference numeral 10, according to an exemplary aspect of the present invention. The padlock 10 may include a cover 20 having an opening 23 formed therein. The opening 23 of the cover 20 may include shackle through holes 21 positioned at either end of the opening 23. The shackle through holes 21 may be substantially semicircular in configuration. The cover 20 may also include one or more fixture holes 22 positioned within the cover 20. The padlock 10 may also include a shackle-top-cover 30 configured and dimensioned to be received within the opening 23 of the cover 20. The shackle-top-cover 30 may include shackle through holes 31 positioned at either end of the shackle-top-cover 30. The shackle through holes 31 are dimensioned so as to cooperate with the shackle through holes 21 of the cover 20 in order to bound a pair of substantially circular passageways in the cover 20 when the shackle-top-cover 30 is positioned in the opening 23 of the cover 20. The padlock 10 may be formed from a front body 40 and a rear body 50. The front body 40 and the rear body 50 may be fit together by one or more posts extending from the front body 40 and configured to be received in one or more corresponding recesses of the rear body 50. When assembled, the front body 40 and the rear body 50 are configured and dimensioned to be received within the cover 20. The rear body 50 may be affixed to the cover 20 by one or more fixture pegs (not shown) inserted through the fixture holes 22 of the body 20 into one or more fixture holes 56 of the rear body 50. Then fixture pegs (not shown) will be pressed fitted into the fixture holes 22/56 of the cover 20 and the rear body 50 to make all components fixed and stay together to form the padlock 10. The fixture pegs (not shown) cannot be removed once fitted into the fixture holes 22/56.

Figure 4A:
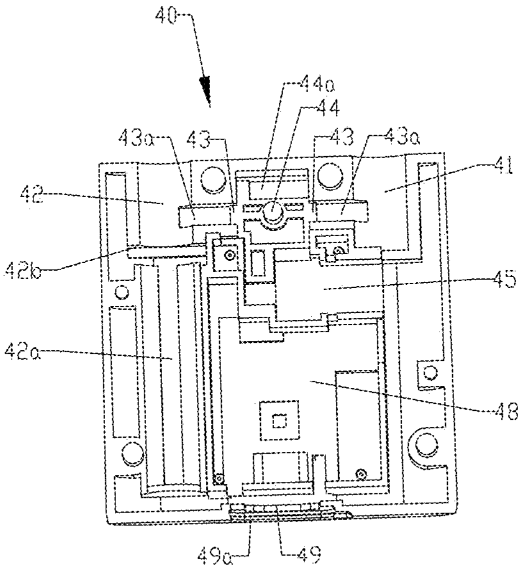
FIG. 4A is a front view of an exemplary front body that may be used with the exemplary padlock according to an aspect of the present invention.
Figure 4B:
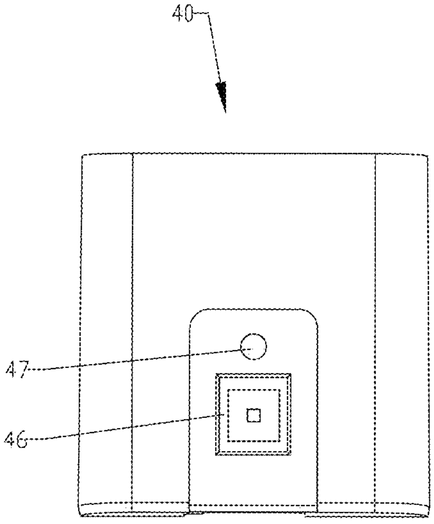
FIG. 4B is a rear view of the exemplary front body that may be used with the exemplary padlock according to an aspect of the present invention.

Referring now to FIGS. 4A and 4B, the front body 40 of the padlock 10 includes a short-leg shackle hole 41 and a long-leg shackle hole 42 formed therein. The long-leg shackle hole 42 may have a shackle-fin slot 42*a* positioned adjacent to the long-leg shackle hole 42, and a fin stopper 42*b* formed in the front body 40 about the long-leg shackle hole 42. The front body 40 of the padlock 10 may also include one or more bolt slots 43 formed in the front body 40, and positioned between the short-leg shackle hole 41 and the long-leg shackle hole 42 and intersecting therewith. Each of the one or more blot slots 43 may include a bolt-spring slot 43*a* formed adjacent thereto. The front body 40 may also include a cam pole 44 extending from the front body 40 and positioned between the one or more bolt slots 43. A cam-spring slot 44*a* may also be formed in the front body 40 adjacent to the cam pole 44. The front body 40 may also include a motor-slot 45, a battery slot 48, a USB slot 49 with a USB-cover hole 49*a*. On the opposite side of the front body 40, the front body 40 may include a panel-slot 46 and a flash-light hole 47 formed therein.

Figure 5A:
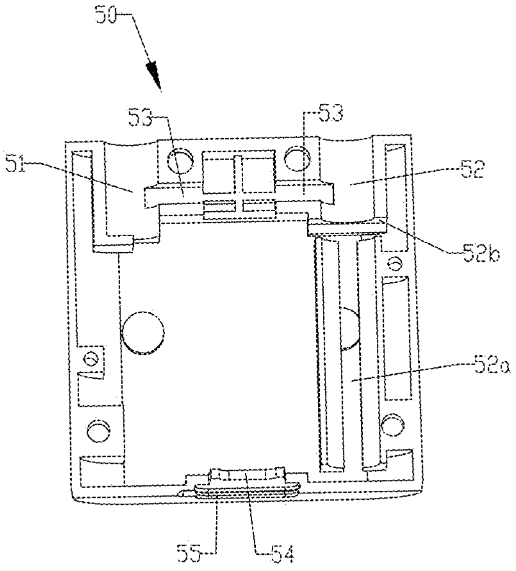
FIG. 5A is a front view of an exemplary rear body that may be used with the exemplary padlock according to an aspect of the present invention.
Figure 5B:
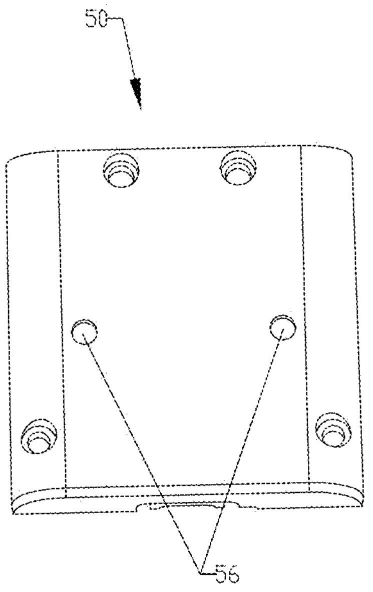
FIG. 5B is a rear view of the exemplary rear body that may be used with the exemplary padlock according to an aspect of the present invention.
Figure 6:
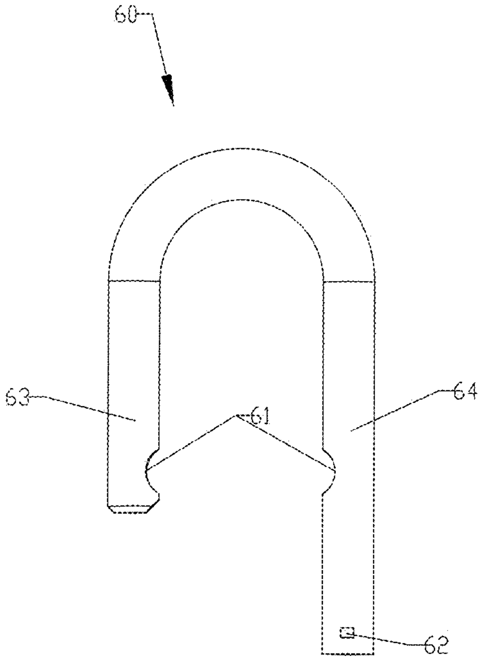
FIG. 6 is a side view of an exemplary shackle that may be used with the exemplary padlock according to an aspect of the present invention.
Figure 7:
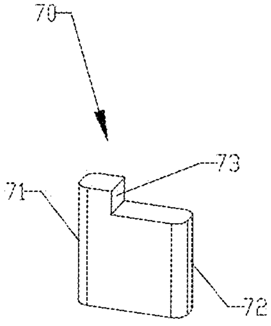
FIG. 7 is a perspective view of an exemplary bolt that may be used with the exemplary padlock according to an aspect of the present invention.
Figure 8:
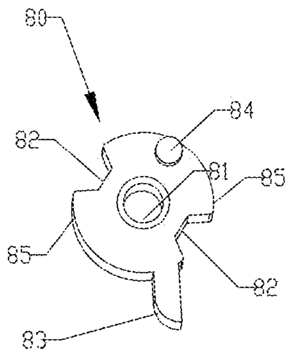
FIG. 8 is a perspective view of an exemplary cam that may be used with the exemplary padlock according to an aspect of the present invention.
Figure 9A:
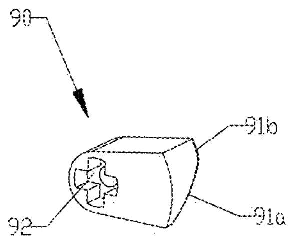
FIG. 9A is a front perspective view of an exemplary sloped-cam that may be used with the exemplary padlock according to an aspect of the present invention.
Figure 9B:
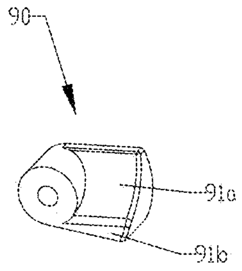
FIG. 9B is a rear perspective view of the exemplary sloped-cam that may be used with the exemplary padlock according to an aspect of the present invention.
Figure 10:
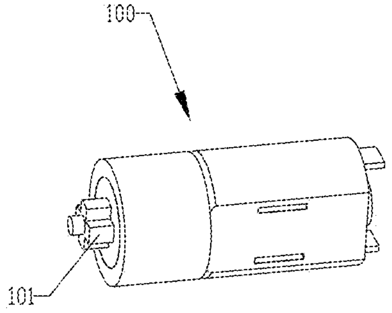
FIG. 10 is a perspective view of an exemplary motor that may be used with the exemplary padlock according to an aspect of the present invention.
Figure 11:
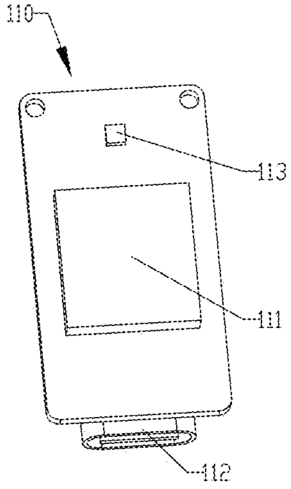
FIG. 11 is a perspective view of an exemplary fingerprint panel that may be used with the exemplary padlock according to an aspect of the present invention.
Figure 12:
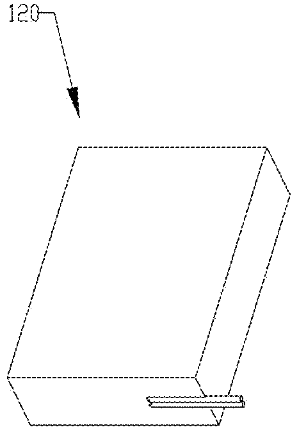
FIG. 12 is a perspective view of an exemplary battery that may be used with the exemplary padlock according to an aspect of the present invention.
Figure 13:
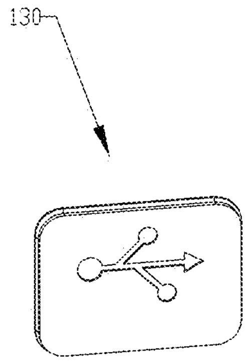
FIG. 13 is a perspective view of an exemplary USB cover that may be used with the exemplary padlock according to an aspect of the present invention.
Figure 14A:
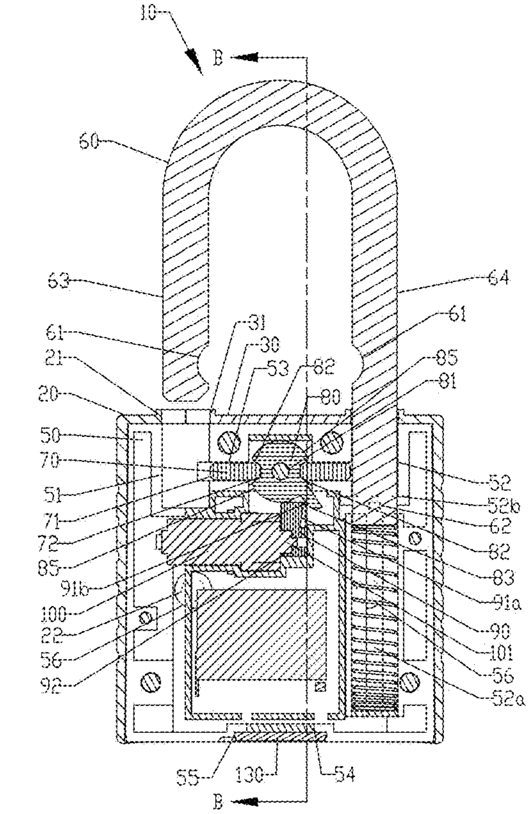
FIG. 14A is a cross-sectional view of an exemplary padlock according to an aspect of the invention in an unlocked mode taken along line A-A from FIG. 14B.
Figure 14B:
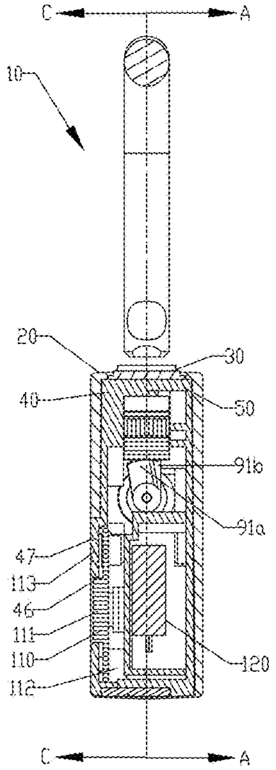
FIG. 14B is a cross-sectional view of the exemplary padlock taken along line B-B from FIG. 14A.
Figure 14C:
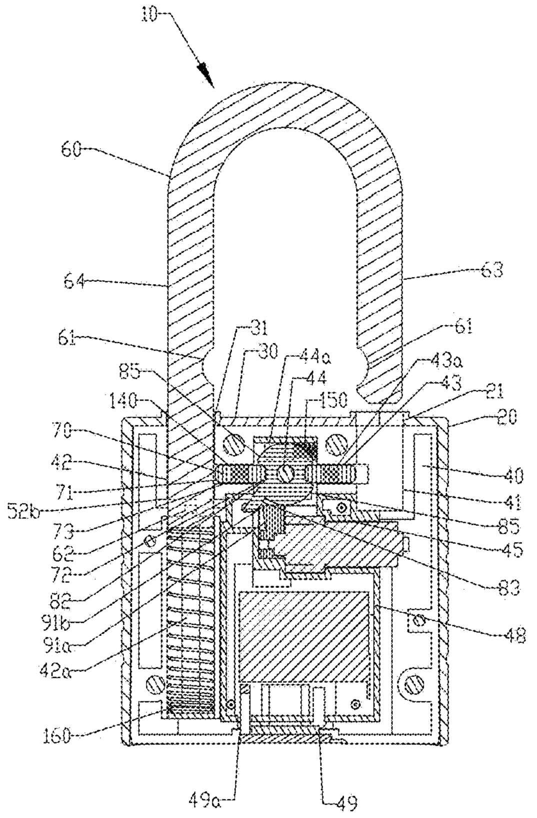
FIG. 14C is a cross-sectional view of the exemplary padlock taken along line C-C from FIG. 14B.

Referring now to FIGS. 5A and 5B, the rear body 50 of the padlock 10 may include a short-leg shackle hole 51 and a long-leg shackle hole 52 formed therein. The long-leg shackle hole 52 may have a shackle-fin slot 52*a* positioned adjacent to the long-leg shackle hole 52, and a fin stopper 52*b* formed in the rear body 50 about the long-leg shackle hole 52. The rear body 50 of the padlock 10 may also include one or more bolt slots 53 formed in the rear body 50, and positioned between the short-leg shackle hole 51 and the long-leg shackle hole 52 and intersecting therewith. The rear body 50 may also include a USB slot 54 and a USB-cover hole 55.

Referring now to FIGS. 1A-1C, 2-3, 4A-4B, 5A-5B, 6-7 and 14A-14C, the padlock 10 may also include a shackle 60 having a short-leg shackle 63 and a long-leg shackle 64. During the locked mode, the short-leg-shackle 63 will not move out of the short-leg shackle hole 41. Each of the short-leg shackle 63 and the long-leg shackle 64 may have a bolt-cutout formed therein. The long-leg shackle 64 may have at least one extended-fin 62 extending therefrom. The short-leg shackle 63 may be received within the padlock 10 in a passageway formed by the short-leg shackle hole 41 of the front body 40 and the short-leg shackle hole 51 of the rear body 50 when the front body 40 and the rear body 50 are joined together. Likewise, the long-leg shackle 64 may be received within the padlock 10 in a passageway formed by the long-leg shackle hole 42 of the front body 40 and the long-leg shackle hole 52 of the rear body 50 when the front body 50 and the rear body 50 are joined together. The extended-fin 62 of the long-leg shackle 64 may be received in either the shackle-fin-slot 42*a* of the front body 40 or the shackle-fin slot 52*a* of the rear body 50 depending upon the location of the extended-fin 62 on the long-leg shackle 64. The extended-fin 62 allows for rectilinear movement of the long-leg shackle 64 within the padlock 10 as a result of the guiding arrangement of the shackle-fin slot 42*a* and/or the shackle-fin slot 52*a*. The combination of the fin stopper 42*b* of the front body 40 and the fin stopper 52*b* of the rear body 50 inhibit removal of the long-leg shackle 64 out of the padlock 10, since the extended-fin 62 is larger than the passageway created by the long-leg shackle hole 42 and the long-leg shackle hole 52. The padlock 10 may also include a shackle spring 160 positioned so as to urge the long-leg shackle 64 in a direction away from the front body 40 and the rear body 50 when the padlock 10 is in the unlocked mode. In the unlocked mode the shackle 60 can pop open, as a result of the shackle spring 160 acting upon the long-leg shackle 64, until the extended-fin 62 contacts the fin-stoppers 42*b*/52*b*. However, the fin stoppers 42*b*/52*b* do allow for rotational movement of the shackle 60 about the longitudinal axis of the long-leg shackle 64 when the short-leg shackle 63 has been removed from the padlock 10 as a result of engagement of the extended-fin 62 with a groove formed by the fin stoppers 42*b*/52*b*. The padlock 10 may also include one or more bolts 70 positioned in the padlock 10 and movable along a passageway created by the bolt slot 43 of the front body 40 and the bolt slot 53 of the rear body 50 when the front body 40 and the rear body 50 are joined together. The bolt 70 may include a shackle-locking side 71 positioned so as to engage with the bolt-cutout 61 on the short-leg shackle 63 or the long-leg shackle 64. The bolt 70 may also include a cam-locking side 72 positioned so as to face and/or engage with a cam 80 positioned within the padlock 10. The bolt 70 may also include a spring receiving surface 73 extending from the bolt 70 and configured to engage with a bolt spring 140 configured to urge the bolts 70 in a direction towards the bolt-cutouts 61. The bolt-spring slot 43*a* of the front body 40 is to place the bolt spring 140 so as to contact the spring-receiving surface 73 of the bolt 70. In this placement, the bolt 70 will always be urged by the spring 140 to push outward and toward the cutouts 61 of the shackle 60 in the locked mode.

Referring now to FIGS. 1A-1C, 2-3, 4A-4B, 5A-5B, 6-8, 9A-9B, 10 and 14A-14C, the cam 80 of the padlock 10 may be positioned on the cam pole 44 for angular movement about the cam pole 44, and the cam 80 has a hole 81 formed therein for this purpose. The cam pole 44 of the front body 40 is to receive the hole 81 of the cam 80. Once the cam 80 has been assembled on the cam pole 44 the cam 80 will only have rotational movement. The cam 80 may also include one or more opening-slots 82 forming indents in the cam 80, and configured to receive the one or more bolts 70 within the opening-slots 82. The cam 80 may also include one or more locking-surfaces 85 positioned adjacent to the bolts 70 and configured to restrict and/or prevent movement of the bolts 70 within the padlock 10 when the bolts 70 are not positioned within the opening-slots 82 of the cam 80. The cam 80 may also include a pole 84 extending from the cam 80 and configured for engagement with a cam spring 150 that is configured to urge the cam 80 in an angular direction such that the locking-surfaces 85 are positioned adjacent to the bolts 70. The cam-spring-slot 44*a* of the front body 40 is configured to place the cam spring 150 in contact with the pole 84 of the cam 80. The cam spring 150 will exert force such that the cam 80 will always rotate back toward the locking position which will cause the padlock 10 to have automatic lock back function once the padlock 10 is opened when the short-leg shackle 63 is moved away from the short-leg shackle holes 41/51. The cam 80 may also include a tail 83 positioned for operative engagement with a sloped-cam 90. The sloped-cam 90 may include a lock-slope 91*a* configured to restrict movement of the cam 80 when the tail 83 of the cam 80 is engaged with the lock-slope 91*a*, and an opening-slope 91*b* configured to engage with the tail 83 of the cam 80 and allow angular movement of the cam 80 about the cam pole 44. The sloped-cam 90 may also include a motor-teeth receiving slot 92 configured for engagement with teeth 101 of a motor 100 disposed within the motor-slot 45 of the front body 40. The teeth 101 may be assembled into the motor-teeth receiving slot 92 of the sloped-cam 90. The motor-slot 45 of the front body 40 is to assemble the motor 100 into the padlock 10. The motor 100 is configured to cause rotation of the sloped-cam 90 in order to effect rotation of the cam 80 about the cam pole 44. The lock-slope 91*a* of sloped-cam 90 contacts with the tail 83 of the cam 80 during the locked mode of the padlock 10.

Referring now to FIGS. 1A-1C, 2-3, 4A-4B, 5A-5B, 11-13 and 14A-14C, the padlock 10 may also include a fingerprint panel 110 positioned behind the panel-slot 46 of the front body 40. The fingerprint panel 110 contains a sensor 111 which is configured for control of the movement of the motor 100 and sloped-cam 90 when the padlock 10 is operated between the locked mode and the unlocked mode. The flash-light hole 47 of the front body 40 is configured to receive the flash light 113 of the panel 110 in order to provide an indication to the user of the mode of the padlock 10. The fingerprint panel 110 could also have an additional feature for Bluetooth opening application processors where Bluetooth processors are integrated into the fingerprint panel 110 such that the control of the motor 100 is not just by a fingerprint, but also with Bluetooth smartphone opening via an application. The fingerprint panel 110 may also include a USB charging port 112. The USB charging port may be positioned in the USB slots 49/54 of the front body 40 and the rear body 50. The padlock 10 may also include a battery 120 positioned in the battery slot 48 of the front body 40, and the battery 120 may be configured to provide power to the fingerprint panel 110 and the motor 100. The battery 120 may be rechargeable and electrically coupled to the USB charging port 112 in order to receive a flow of current to recharge the battery 120. The padlock 10 may also include a USB cover 130 positioned over the USB-cover holes 49*a*/55 of the front body 40 and the rear body 50 to cover the USB charging port 112 and provide at least some rain and/or water resistance for the USB charging port 112.

Referring now to FIGS. 1A-1C, 2-3, 4A-4B, 5A-5B, 6-8, 9A-9B and 10-13, the locked mode of the padlock 10 will now be discussed. In the locked mode, the bolt-cutouts 61 of the shackle 60 are aligned with the shackle-locking sides 71 of the bolts 70. The bolt-spring 140 acts upon the spring receiving surface 73 of the bolts 70 to urge the bolts 70 towards the bolt-cutouts 61 of the shackle 60 during the locked mode. The cam-locking side 72 of the bolt 70 is further aligned with the locking-surface 85 of the cam 80. As the cam spring 150 is configured urges the pole 84 of the cam 80 in a counterclockwise direction (e.g., FIG. 1C), the tail 83 of the cam 80 contacts the lock-slope 91*a* of the sloped-cam 90. The motor-teeth receiving slot 92 of the sloped-cam 90 is engaged with the teeth 101 of the motor 100, and when there is no correct fingerprint placed on the fingerprint sensor 111 of the fingerprint panel 110 the motor 100 does not actuate, and there is no rotational movement of the sloped-cam 90. As a result, the tail 83 of the cam 80 remains in contact with the lock-slope 91*a* of the sloped-cam 90, the cam 80 does not rotate about the cam pole 44 and the bolt 70 does not move from engagement with the bolt-cutout 61 of the shackle 60. In the locked mode the cam-locking-side 72 of the bolt 70 is aligned with the locking-surface 85 of the cam 80, but there may be some clearance between the cam-locking side 72 and the locking-surface 85 as the bolt-spring 140 will push the bolt 70 toward the cutout 61 of the shackle 60 during the locked mode. As the padlock 10 is operated between the locked mode and unlocked mode by the motor 100, the sloped-cam 90 will push the tail 83 of the cam 80 such that the cam 80 rotates without the cam-locking side 72 of the bolt 70 contacting the cam 80 to interfere with the rotational movement of the cam 80 from the locked mode to the unlocked mode.

Referring now to FIGS. 2-3, 4A-4B, 5A-5B, 6-8, 9A-9B, 10-13 and 14A-14C, the unlocked mode of the padlock 10 will now be discussed. The padlock 10 may be operated from the locked mode to the unlocked mode by presentation of a correct fingerprint to the fingerprint sensor 111 of the fingerprint panel 110. The correct fingerprint will have been preprogramed into the padlock 10 in accordance with known procedures for configuring operation of the padlock 10 by the fingerprints of one or more authorized users. For example, the authorized user may be the owner of the padlock 10, and/or the owner of a location or item to be secured by the padlock 10. The padlock 10 may include different levels of authorization control, such that one authorized user may have the authority to add other authorized users to the padlock 10, but the other authorized users cannot then add further authorized users to the padlock 10. The padlock 10 may include a memory (not shown) configured to store the fingerprints of the one or more authorized users, and a processor (not shown) configured to retrieve and/or compare an input fingerprint to the one or more stored authorized fingerprints.

Still referring to FIGS. 2-3, 4A-4B, 5A-5B, 6-8, 9A-9B, 10-13 and 14A-14C, when a correct fingerprint is presented in the fingerprint sensor 111 of the fingerprint panel 110 the motor 100 will rotate. As the motor 100 rotates, the teeth 101 engaged with the motor-teeth receiving slot 92 will transfer the rotational motion of the motor 100 to the sloped-cam 90, which will turn in the same manner. The sloped-cam 90 rotates such that the opening-slope 91*b* will push the tail 83 of the cam 80 to cause rotational movement of the cam 80. As the cam 80 is pushed in a clockwise movement (FIG. 14C), the cam-locking side 72 of the bolt 70 will align with the opening-slot 82 of the cam 80. As the cam-locking side 72 of the bolt 70 aligns with the opening-slot 82 of the cam 80, then the shackle spring 160 will push the long-leg shackle 64 upward. As a result of the movement of the long-leg shackle 64, the shackle-locking side 71 of the bolt 70 will be pushed out of the bolt-cutout 61, and the bolt 70 will be pushed in the direction of the opening-slot 82 of the cam 80. In this position, the cam-locking-side 72 of the bolt 70 will now engage with the opening-slot 82 of the cam 80, and the shackle-locking side 71 will contact the long-leg shackle 64 of the shackle 60. In this sandwiched position of the bolt 70, the cam 80 will not be able to rotate back to the locked position since this sandwiched position will make the opening-slot 82 and cam-locking-side 72 of the bolt 70 and long-leg shackle 64 of the shackle 60 remain fully engaged, the cam spring 150 remains in compressed status but cannot go back to the locked position. The extended-fin 62 on the long-leg shackle 64 of the shackle 60 moves along the shackle-fin slot 42*a* and/or shackle-fin slot 52*a* until the extended-fin 62 contacts the fin-stopper 42*b*/52*b* of the front body 40 or rear body 50. The short-leg 63 of the shackle 60 will move away from the short-leg shackle hole 41/51 formed by the front body 40 and the rear body 50 and the padlock 10 is placed in the unlocked mode. In the unlocked mode, the bolts 70 are disengaged from the bolt-cutouts 61 on the short-leg shackle 63 and the long-leg shackle 64 as a result of rotation of the cam 80 to allow the cam-locking sides 72 of the bolts 70 to be received within the opening slots 82 of the cam 80. The cam 80 is rotated as a result of the opening-slope 91*b* of the sloped-cam 90 acting upon the tail 83 of the cam 80 during rotation of the sloped-cam 90 caused by the motor 100. As the shackle 60 is in the opened position, the motor 100 will turn back to the locked position and the lock-slope 91*a* will rotate back towards the lock position. Since the tail 83 of the cam 80 is still in the opened status and in a sandwiched position, the tail 83 of the cam 80 will not be in contact with the lock-slope 91*a* or the opening-slope 91*b* of the sloped-cam 90.

Referring now to FIGS. 1A-1C, 2-3, 4A-4B, 5A-5B, 6-8, 9A-9B, 10-13 and 14A-14C, to relock the padlock 10 and return the padlock 10 to the locked mode from the unlocked mode, the user will push the short-leg shackle 63 of the shackle 60 into the short-leg hole 41/51 formed by the front body 40 and the rear body 50. As the short-leg shackle 63 is inserted into the short-leg hole 41/51, the shackle-locking side 71 of each of the bolts 70 will align with the cutouts 61 of the shackle 60. Then the bolt spring 140 will push the bolt 70 outward toward the cutouts 61 of the shackle 60. As the shackle-locking-side 71 of the bolt 70 engages with the cutouts 61 of the shackle 60, the cam-locking-side 72 of the bolt 70 will no longer engage with the opening-slot 82 of the cam 80. The cam spring 150 will push the pole 84 of the cam 80 in counterclockwise movement such that the tail 83 of the cam 80 will contact the lock-slope 91*a* of the sloped-cam 90. The cam-locking-side 72 of the bolt 70 will now align with the locking-surface 85 of the cam 80. The padlock 10 has now been returned to the locked mode. The movement from the unlocked mode to the locked mode is performed mechanically without any electrical power needed for relocking of the padlock 10.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A padlock, comprising:

a lock body;

a shackle having a long leg and a short leg, wherein the short leg has a bolt-cutout formed therein, and wherein the long leg of the shackle is retained within the lock body;

a bolt configured for engagement with the bolt-cutout in the short leg when the padlock is in a locked mode, and wherein the bolt is configured for disengagement from the bolt-cutout in the short leg when the padlock is in an unlocked mode;

a fingerprint panel configured to cause operation of the padlock from the locked mode to the unlocked mode;

a cam configured for rotational movement within the lock body, and comprising an opening-slot configured to receive the bolt when the padlock is in the unlocked mode, wherein the bolt is removed from the opening-slot when the padlock is in the locked mode; and a sloped-cam operatively coupled to the cam and configured to control rotational movement of the cam within the lock body;

wherein the bolt comprises a shackle-locking side configured for engagement with the bolt-cutout in the short leg and a spring receiving surface;

wherein the padlock further comprises a bolt spring positioned in the lock body and configured to engage with the spring receiving surface to urge the bolt in a direction towards the bolt-cutout in the short leg;

wherein the cam further comprises a tail configured for operative engagement with the sloped-cam;

wherein the sloped-cam further comprises a lock-slope and an opening-slope, wherein the lock-slope is configured for engagement with the tail of the cam when the padlock is in the locked mode, and the opening-slope is configured for engagement with the tail of the cam when the padlock is in the unlocked mode; and wherein the cam further comprises a pole extending therefrom and configured for engagement with a cam spring positioned within the lock body and configured to urge the pole in a direction so that the tail of the cam is engaged with the lock-slope of the sloped-cam when the padlock is in the locked mode.

2. The padlock according to claim 1, further comprising a second bolt, wherein the long leg has a second bolt-cutout formed therein, wherein the second bolt is configured for engagement with the second bolt-cutout in the long leg.

3. The padlock according to claim 2, further comprising a shackle spring engaged with the long leg of the shackle, wherein the cam further comprises a second opening-slot;

wherein the shackle spring is configured to urge the long leg in a direction such that the second bolt, engaged with the second bolt-cutout, becomes disengaged from the second bolt-cutout, such that the second bolt is received within the second opening-slot of the cam; and wherein the shackle spring is configured to urge the long leg in the direction such that the short leg of the shackle is removed from the lock body so as to position the padlock in the unlocked mode.

4. The padlock according to claim 3, wherein the second bolt comprises a shackle-locking side configured for engagement with the second bolt-cutout in the long leg when the padlock is in the locked mode and the second bolt is configured for engagement with another portion of the long leg when the padlock is in the unlocked mode;

wherein the second bolt further comprises a cam-locking side configured for engagement with the second opening-slot of the cam when the padlock is in the unlocked mode; and wherein in the unlocked mode, the second bolt is disengaged from the second bolt-cutout in the long leg and is positioned between the long leg and the second opening-slot of the cam.

5. The padlock according to claim 4, wherein when the second bolt is disengaged from the second bolt-cutout in the long leg, the second bolt is positioned between the long leg and the second opening-slot of the cam, such that rotational movement of the cam within the lock body of the padlock is prevented.

6. The padlock according to claim 1, wherein the short leg of the shackle is retained within the lock body of the padlock by the bolt when the padlock is in the locked mode.

7. The padlock according to claim 1, further comprising:

a motor positioned within the lock body and operatively coupled to the sloped-cam;

wherein the motor is configured to operate and cause rotational movement of the sloped-cam when an authorized user provides a fingerprint to the fingerprint panel.

8. The padlock according to claim 1, further comprising a motor positioned within the lock body and operatively coupled to the sloped-cam; and wherein the motor is configured to rotate the sloped-cam such that the opening-slope of the sloped-cam contacts the tail of the cam to cause rotational movement of the cam such that the bolt is received by the opening-slot of the cam.

9. The padlock according to claim 8, wherein the motor comprises teeth and the sloped-cam comprises a motor-teeth receiving slot configured for operative engagement with the teeth of the motor such that rotational movement of the motor is transferred to the sloped-cam; and wherein the motor is configured to rotate when an authorized user provides a fingerprint to the fingerprint panel.

10. The padlock according to claim 1, wherein the lock-slope has a height which is less than a height of the opening-slope.

11. The padlock according to claim 1, wherein when the bolt-cutout in the short leg is aligned with the shackle-locking side of the bolt, the bolt spring is configured to push a cam-locking side of the bolt away from the opening-slot of the cam and the cam spring is configured to push the pole of the cam in order to cause rotational movement of the cam until the tail of the cam contacts the lock-slope of the sloped-cam.

12. The padlock according to claim 11, wherein there is clearance between a locking-surface of the cam and the cam-locking side of the bolt.

13. The padlock according to claim 1, wherein the fingerprint panel is configured for receipt of a signal from an electronic device to cause operation of the padlock from the locked mode to the unlocked mode.

* * * * *